(12) United States Patent
Schaefer et al.

(10) Patent No.: US 11,319,964 B2
(45) Date of Patent: May 3, 2022

(54) TURBOCHARGER AND BEARING HOUSING THEREFOR

(71) Applicant: BorgWarner Inc., Auburn Hills, MI (US)

(72) Inventors: Wolfram Schaefer, Kleinkarlbach (DE); Grzegorz Rzepka, Rzeszow (PL)

(73) Assignee: Borg Warner Inc., Auburn Hills, MI (US)

( * ) Notice: Subject to any disclaimer, the term of this patent is extended or adjusted under 35 U.S.C. 154(b) by 121 days.

(21) Appl. No.: 16/807,736

(22) Filed: Mar. 3, 2020

(65) Prior Publication Data

US 2020/0291952 A1    Sep. 17, 2020

(30) Foreign Application Priority Data

Mar. 11, 2019   (EP) ..................................... 19161807

(51) Int. Cl.
*F04D 29/046*    (2006.01)
*F04D 29/42*     (2006.01)
(Continued)

(52) U.S. Cl.
CPC ........... *F04D 29/046* (2013.01); *F04D 17/10* (2013.01); *F04D 29/4206* (2013.01); *F16C 17/04* (2013.01); *F16C 2360/24* (2013.01)

(58) Field of Classification Search
CPC .... F04D 17/10; F04D 29/046; F04D 29/4206; F16C 2360/24
See application file for complete search history.

(56) References Cited

U.S. PATENT DOCUMENTS 2,938,659 A * 5/1960 Judson ..................... F01K 25/12
                                                     417/373
4,969,805 A * 11/1990 Romeo ..................... F01D 25/24
                                                     417/360
(Continued)

FOREIGN PATENT DOCUMENTS

DE    2853525 A1    6/1980
EP    0395826 A1    11/1990
(Continued)

OTHER PUBLICATIONS

English language abstract and machine-assisted English translation for CN 105351252 extracted from espacenet.com database on Mar. 23, 2020, 5 pages.
(Continued)

*Primary Examiner* — Connor J Tremarche
(74) *Attorney, Agent, or Firm* — Howard & Howard Attorneys PLLC

(57) ABSTRACT

A bearing housing for a turbocharger is presented. The bearing housing comprises a bearing housing body configured to receive a rotor shaft along a longitudinal axis of the bearing housing body. The bearing housing further comprises a hub connected to the bearing housing body and defining an opening into the bearing housing body, wherein the opening is configured to receive a rotor shaft bearing. Moreover, the bearing housing comprises at least one arm extending radially from the hub, the at least one arm having a first end connected to the hub and a second end opposite to the first end, wherein the second end of the at least one arm comprises a connection structure configured to connect the bearing housing with a compressor housing of the turbocharger.

15 Claims, 4 Drawing Sheets

(51) Int. Cl.
*F04D 17/10* (2006.01)
*F16C 17/04* (2006.01)

(56) References Cited

U.S. PATENT DOCUMENTS

2015/0167690 A1* 6/2015 V .......................... F01D 25/162
                                                            415/170.1
2018/0066676 A1* 3/2018 Castan .................. F04D 29/266
2018/0328371 A1  11/2018 Race et al.

FOREIGN PATENT DOCUMENTS

| EP | 2407645 A1 | 1/2012 |
| EP | 3404233 A1 | 11/2018 |
| FR | 2925117 A1 | 6/2009 |
| GN | 105351252 B | 9/2017 |

OTHER PUBLICATIONS

English language abstract and machine-assisted English translation for DE 28 53 525 extracted from espacenet.com database on Mar. 23, 2020, 4 pages.

English language abstract and machine-assisted English translation for FR 2 925 117 extracted from espacenet.com database on Mar. 23, 2020, 4 pages.

* cited by examiner

TURBOCHARGER AND BEARING HOUSING THEREFOR

CROSS-REFERENCE TO RELATED APPLICATIONS

The present United States Patent Application claims priority to and all the benefits of European Patent Application No. 19161807.3 filed Mar. 11, 2019, which is hereby expressly incorporated herein by reference in its entirety.

TECHNICAL FIELD

The present disclosure relates to a turbocharger for an internal combustion engine. More particularly, the present disclosure relates to a bearing housing for a turbocharger and to a turbocharger comprising this bearing housing.

BACKGROUND

Turbochargers deliver compressed air to an intake of an internal combustion engine, allowing more fuel to be combusted. As a result, a power density of the engine is increased without significantly increasing engine weight. Turbochargers thus permit the use of smaller engines that develop the same amount of power as larger, normally aspirated engines. Using a smaller engine in a vehicle has the desired effect of decreasing the vehicle mass, increasing performance and reducing fuel consumption. Moreover, the use of turbochargers leads to an improved combustion and, therefore, to reduced emissions.

Turbochargers include a turbine housing having an inlet passage connected to an exhaust manifold of the engine, a compressor housing having an outlet passage connected to an intake manifold of the engine, and a bearing housing interconnecting the turbine housing and the compressor housing. An exhaust gas flow from the exhaust manifold rotatably drives a turbine wheel in the turbine housing. The turbine wheel is connected via a rotor shaft rotatably supported in the bearing housing to a compressor wheel in the compressor housing. Rotation of the turbine wheel by the exhaust gas flow thus causes rotation of the compressor wheel. The rotating compressor wheel draws in ambient air via a so-called inducer of the compressor housing and compresses the air. Downstream of the compressor wheel the compressed air enters a diffusor channel from which the compressed air is guided via a compressor cover to the intake manifold.

After having driven the turbine wheel, the exhaust gas flow is discharged from the turbine housing via an outlet passage, also referred to as exducer. The outlet passage often has a conical shape and opens out into a flange for connecting the turbocharger to a catalytic converter assembly.

US 2018/0328371 A1 discloses a turbocharger of the type discussed above with a compressor housing in which a diffusor channel is defined between a body of the compressor housing and a backplate. The backplate has a first face that delimits the diffusor channel and a second face opposite the first face that is supported against a face of the bearing housing. The backplate is constructed and arranged to attach to the compressor housing and the bearing housing.

Turbochargers tend to significantly heat up during operation. It is therefore generally desirable to limit a heat flow between the different components of a turbocharger while at the same time permitting efficient heat convection to ambient atmosphere.

SUMMARY

There is a need for a turbocharger with improved thermal properties. There also is a need for a bearing housing for such a turbocharger.

According to one aspect of the present disclosure, a bearing housing for a turbocharger is provided, wherein the bearing housing comprises a bearing housing body configured to receive a rotor shaft along a longitudinal axis of the bearing housing body. The bearing housing further comprises a hub connected to the bearing housing body and defining an opening into the bearing housing body, wherein the opening is configured to receive a rotor shaft bearing. Moreover, the bearing housing comprises at least one arm extending radially from the hub, the at least one arm having a first end connected to the hub and a second end opposite to the first end, wherein the second end of the at least one arm comprises a connection structure configured to connect the bearing housing with a compressor housing of the turbocharger.

The at least one arm has a length extending from its first end to its second end, and a width extending perpendicular to its length. The width may be defined to substantially lie in a plane that extends perpendicular to the longitudinal axis. In some variants, the length of the at least one arm is larger than the width of that arm in a central region along its length. The central region may lie in the middle between the first end and the second end of the at least one arm.

The bearing housing may comprise two or more arms spaced apart in a circumferential direction of the longitudinal axis. In case multiple arms are provided, two or more or all of these arms may have substantially the same geometric configuration.

In one variant, the bearing housing comprises exactly three arms. In other variants, the bearing housing comprises exactly two, four or five arms. Adjacent ones of the two or more arms may be spaced apart in a circumferential direction of the longitudinal axis at substantially the same angular distance. For example, in a variant with two arms the angular distance may be approximately 180°, in a variant with three arms the angular distance may be approximately 120°, and so on.

The second end of the at least one arm may comprise a connection surface facing away from the bearing housing body. To reduce the contact area towards the compressor housing, the connection surface may be smaller than the complete surface of the arm between the first end and the second end that is directed towards the compressor housing. For example, the connection surface may be less than 50% or less than 25% of the complete arm surface.

The at least one arm may comprise a recessed surface between the first end and the second end. The recessed surface may face away from the bearing housing body. The recessed surface may be offset, or recessed, relative to the connection surface towards the bearing housing body.

The connection surface may lie in a first plane perpendicularly intersecting the longitudinal axis. The recessed surface may lie in a second plane that is generally parallel to the first plane. In some variants, the second plane is offset, or recessed, relative to the first plane towards the bearing housing body so as to define a space between the first plane and the second plane. The space may be configured to accommodate at least a portion of a compressor housing backplate in the assembled state of the turbocharger.

The hub may comprise a protrusion that extends around the opening into the bearing housing body and protrudes over an adjacent surface (e.g., the recessed surface) of the at least one arm facing away from the bearing housing body. In some variants, the protrusion extends into the space between the first plane and the second plane.

The connection structure may take various forms. In one variant, the connection structure comprises at least one through-opening. Each through-opening may be configured to receive a bolt member to connect the bearing housing with a compressor housing of the turbocharger.

Also provided is a housing assembly comprising the bearing housing as presented herein and a compressor housing connected to the at least one arm of the bearing housing. The compressor housing comprises a compressor housing body configured to receive a compressor wheel supported on the rotor shaft, and a backplate closing the compressor housing body towards the bearing housing.

The backplate may be clamped between the compressor housing body and the bearing housing. The backplate may not be attached to the compressor housing body by a separate attachment member such as a screw. The backplate may not be attached to the bearing housing by a separate attachment member such as a screw.

The at least one arm may be spaced apart from the backplate. In this manner, the backplate may be thermally decoupled from the at least one arm and, optionally, other components of the bearing housing.

The backplate may have a circumference in a plane extending perpendicular to the longitudinal axis. The first end of the at least one arm may lie radially inside the circumference. Moreover, the second end of the at least one arm may lie radially outside the circumference.

The backplate may have a face directed towards the bearing housing body. Moreover, an open space may be defined between two adjacent arms, the face of the backplate and the bearing housing body. The open space may be configured to enable heat convection to ambient atmosphere. In such or in other variants, the at least one arm may have a face directed towards the backplate, wherein an air gap configured to enable heat convection to ambient atmosphere is provided between the face of the backplate and the face of the at least one arm.

The backplate may comprise an annular recess having a depth extending towards the compressor housing body and an open side facing the bearing housing. The annular recess may assist heat convection.

The backplate may at least partially extend into the opening of the bearing housing body. In such a case, an axial support for the backplate may be located in the opening of the bearing housing body. The axial support may be defined by a step in the opening. A axial rotor shaft bearing, such as a thrust bearing, may functionally be arranged in a force transmitting manner between the backplate and the step.

A fluid sealing may be arranged between the backplate and an inner wall of the opening of the bearing housing body. The fluid sealing may be configured to prevent a lubricating fluid accommodated in the opening from leaking out of the opening.

At least one rotor shaft bearing may be accommodated in the opening of the bearing housing body. The at least one rotor shaft bearing may be an axial bearing such as a thrust bearing. In an axial force transmission path from the compressor body to the bearing housing, the backplate may be located downstream of the compressor housing body and upstream of the rotor shaft bearing, and the rotor shaft bearing may be located downstream of the backplate and upstream of the bearing housing. The backplate may be in direct contact with at least one of the compressor housing body and the rotor shaft bearing. Alternatively, one or more force transmission members may be arranged between any of these components.

Also provided is a turbocharger comprising the housing assembly presented herein. The turbocharger may in particular comprise the compressor housing and the bearing housing. The turbocharger may additionally comprise a turbine housing. The bearing housing may interconnect the compressor housing and the turbine housing.

BRIEF DESCRIPTION OF THE DRAWINGS

Additional aspects and advantages of the present disclosure will be readily appreciated by reference to the following detailed description when considered in connection with the accompanying drawings, wherein.

DETAILED DESCRIPTION

Figure 1:
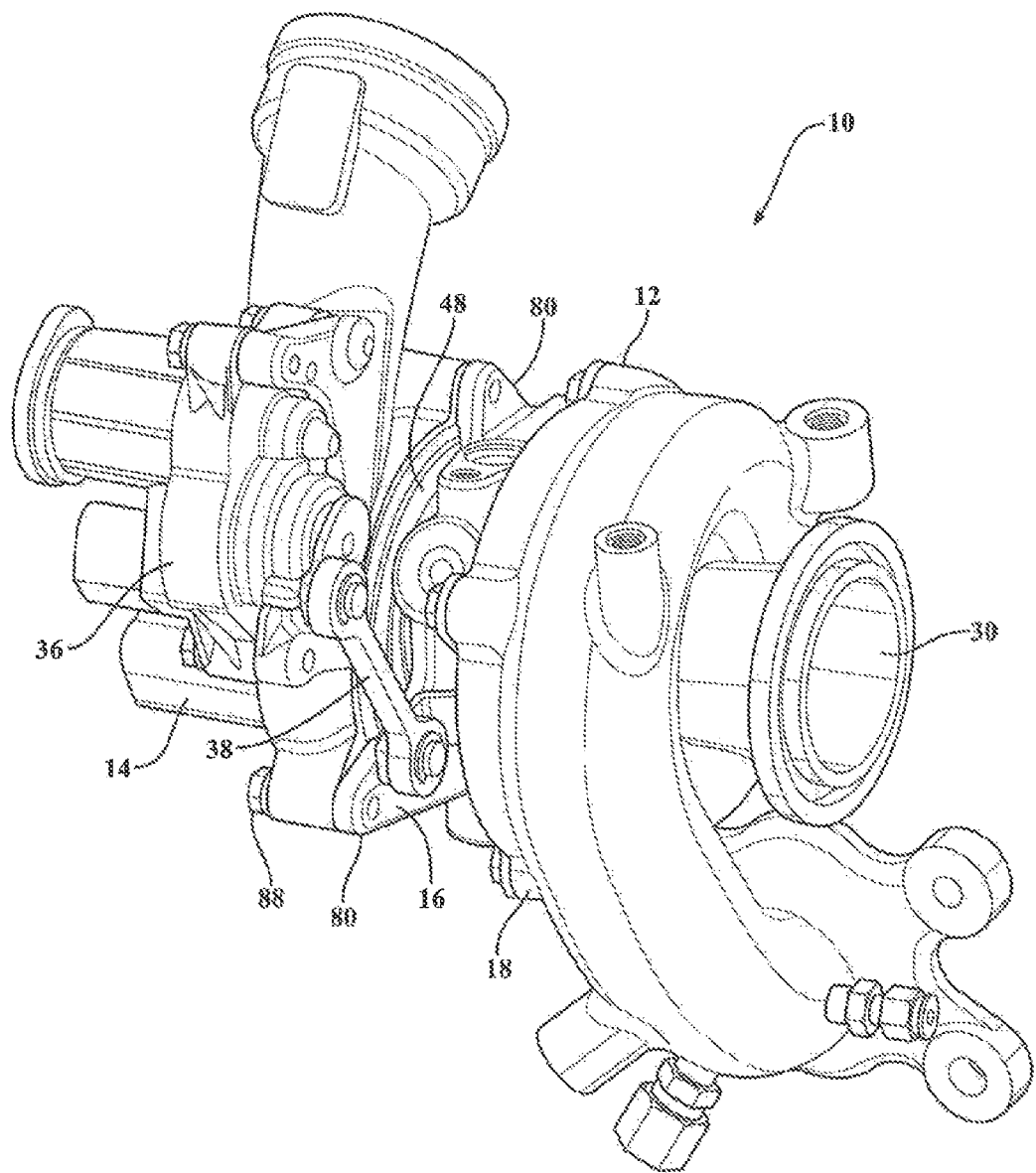
FIG. 1 is a perspective view of a turbocharger with a bearing housing according to one embodiment of the present disclosure.
Figure 2:
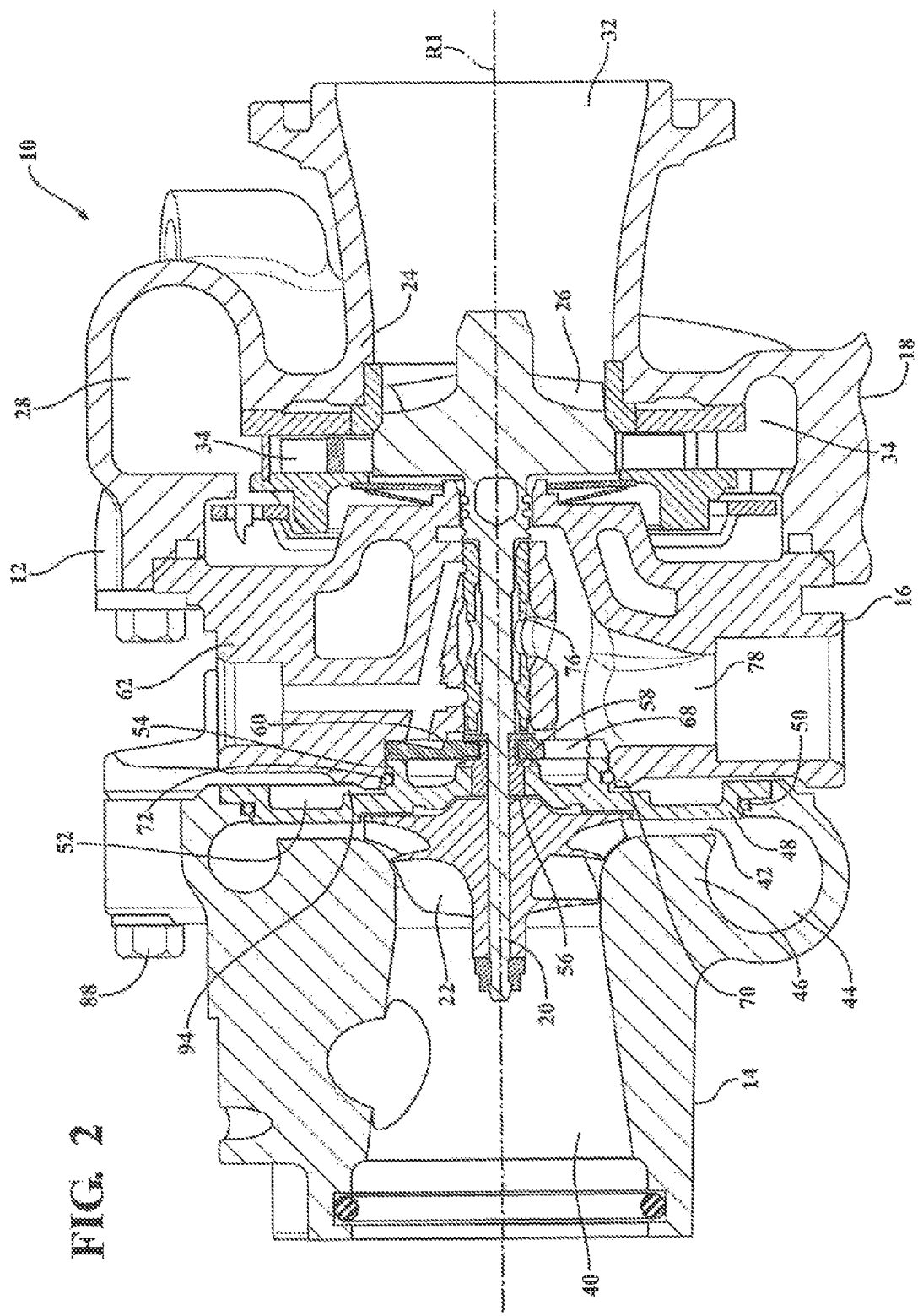
FIG. 2 is a schematic cross-sectional side view of the turbocharger of FIG. 1.

FIGS. 1 and 2 illustrate an embodiment of a turbocharger 10 for an internal combustion engine. The turbocharger 10 includes a housing assembly 12 consisting of a compressor housing 14, a bearing housing 16, and a turbine housing 18 that are connected to each other.

The bearing housing 16 supports a rotor shaft 20 that defines an axis of rotation R1. A compressor wheel 22 with a plurality of blades is mounted on one end of the shaft 20 and is housed within the compressor housing 14. The turbine housing 18 has a turbine housing body 24 and houses a turbine wheel 26 with a plurality of blades. The turbine wheel 26 is mounted on an opposite end of the shaft 20 in relation to the compressor wheel 22.

The turbine housing 18 includes an inlet passage 28 that is coupled to an exhaust manifold (not shown) of the engine to receive an exhaust gas flow. The inlet passage 28 has the form of a volute and directs the exhaust gas flow into the turbine housing body 24 towards the turbine wheel 26. The exhaust gas flow rotatably drives the turbine wheel 26 on the shaft 20, thereby causing the compressor wheel 22 to rotate also. After driving the turbine wheel 26, the exhaust gas flow is discharged through a conically shaped outlet passage 32 of the turbine housing 18. This outlet passage 32 is also known as exducer.

In order to improve performance and efficiency of the turbocharger 10, it is common to regulate the exhaust gas flow to the turbine wheel 24 using a guide apparatus. The guide apparatus is positioned within the turbine housing 18 and includes a plurality of guide vanes 34 located downstream of the inlet passage 26 and upstream of the turbine wheel 24. The space between adjacent guide vanes 34 defines a flow channel through which the exhaust gas flows to the turbine wheel 24. By varying an angular position of the guide vanes 34 (via a pneumatic actuator 36 and a force transmission member 38 as illustrated in FIG. 1), a respective cross-section of the flow channels is adjustable, as is known in the art, to realize a Variable Turbine Geometry (VTG).

The compressor housing 14 includes an inlet passage 40. This inlet passage 40 is also referred to as inducer. Upon rotation of the compressor wheel 22, ambient air is drawn into the compressor housing 14 through the inlet passage 40 and compressed by the compressor wheel 22. Downstream of the compressor wheel 22 the compressed air enters a diffusor channel 42 from which the compressed air is guided via an outlet passage 44 in the form of a volute to an intake manifold (not shown) of the engine.

The diffusor channel 42 is defined between a compressor housing body 46 and a backplate 48 of the compressor housing 14. A sealing ring 50 is arranged between a face of the backplate 48 directed towards the compressor housing body 46 and a face of the compressor housing body 46 directed towards the backplate 48. The sealing ring 50 prevents compressed air from leaking out of the compressor housing 14.

The backplate 48 is substantially disk-shaped and has a diameter that is substantially larger than a diameter of the compressor wheel 22 so as to delimit the diffusor channel 42 that extends in a radial direction away from the compressor wheel 22. The backplate 48 has an annular recess 52 in a region where it delimits the diffusor channel 42. Moreover, the backplate 48 has a cylindrical protrusion 54 on its face directed away from the compressor wheel 22.

The backplate 48 comprises a central through-opening 56. The rotor shaft 20 extends through this through opening 56. A sleeve 58, also called flinger sleeve, is seated on the rotor shaft 20 so as to rotate together with the rotor shaft 20. The sleeve 58 has circumferential grooves facing towards the backplate 48 and each accommodating a piston ring (not shown in FIG. 2). The sleeve 58 and piston rings create a labyrinth sealing that prevents air leakage from the compressor housing 14 towards the bearing housing 16 and leakage of a lubricating fluid in the opposite direction. A similar labyrinth sealing is provided at the opposite end of the rotor shaft 20 adjacent the turbine wheel 26.

The bearing housing 16 has a bearing housing body 62. In an axial force transmission path from the compressor housing body 46 to the bearing housing body 62, the backplate 48 is located downstream of the compressor housing body 46 and upstream of an axial rotor shaft bearing 60 (also called thrust bearing). The axial bearing 60, in turn, is located downstream of the backplate 48 and upstream of the bearing housing body 62. An axial force acting on the backplate 48 in a direction towards the turbine housing 18 will be transferred from the backplate 48 via a face of its cylindrical protrusion 54 to the axial bearing 60 and from the axial bearing 60 to the compressor housing body 62. An axial force acting on the axial bearing 60 in the opposite direction will be transferred via the backplate 48 to the compressor housing body 48. As is well known in the art, such an axial force towards the compressor housing 14 can be transferred onto the axial bearing 60 by the rotor shaft 20 that has a stepped profile for cooperating with the axial bearing 60.

Figure 3:
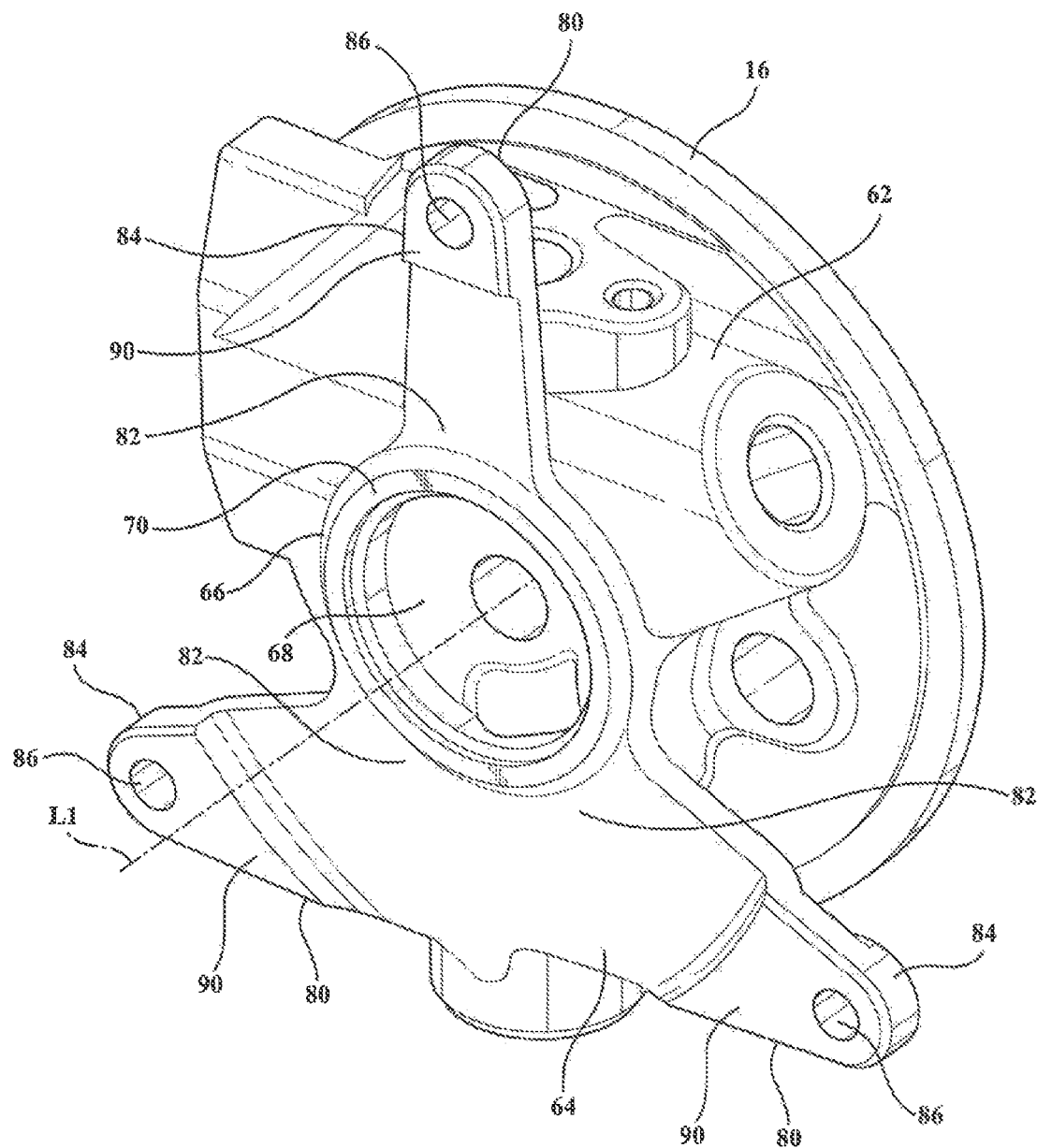
FIG. 3 is a perspective view of the bearing housing of the turbocharger of FIG. 1.
Figure 4:
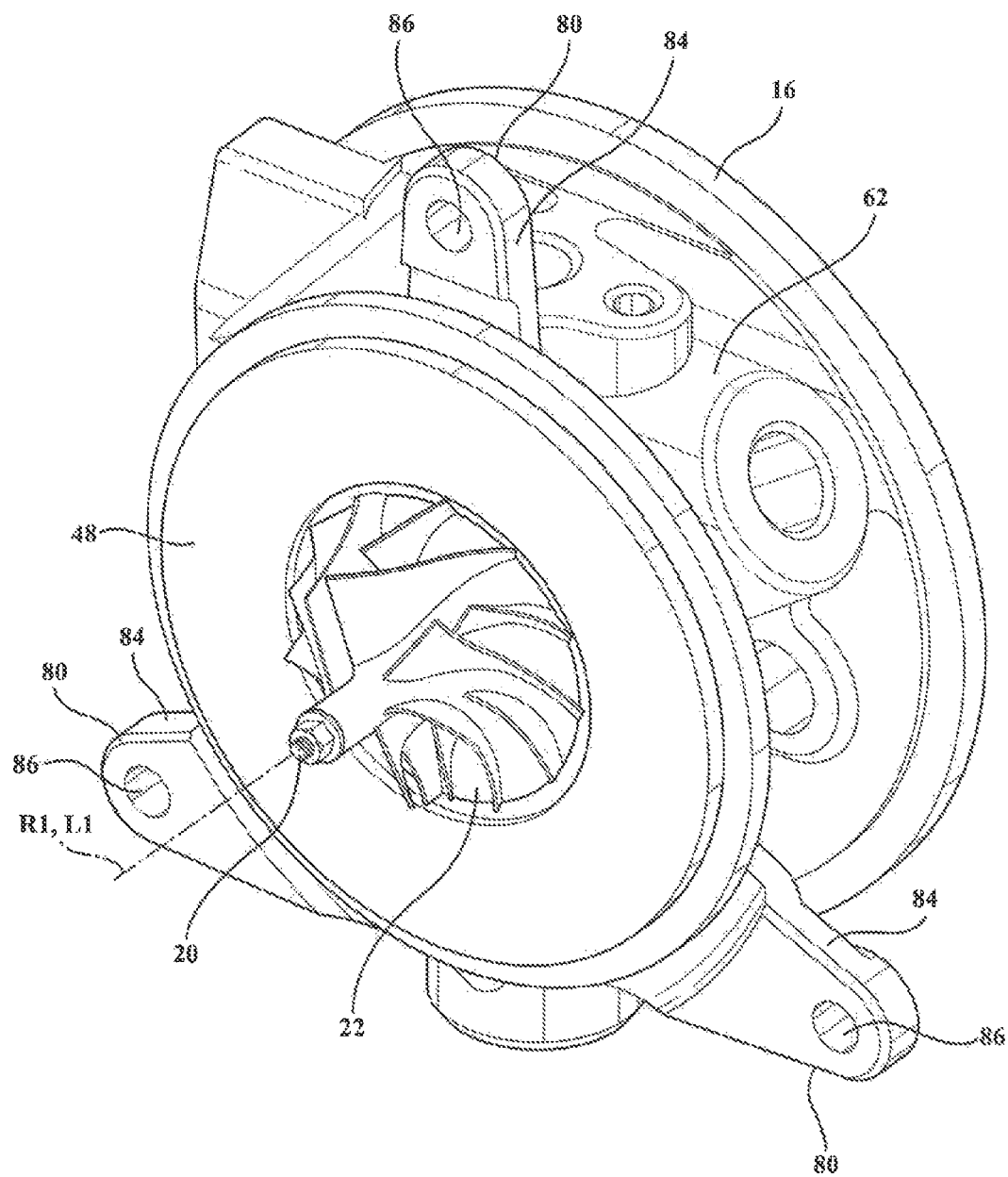
FIG. 4 is a perspective view of the bearing housing of FIG. 3 with an additional illustration of the locations of a backplate and a compressor wheel relative to the bearing housing in an assembled state of the turbocharger.

Now also referring to FIGS. 3 and 4, the bearing housing body 62 and is configured to receive the rotor shaft 20 along a longitudinal axis L1 of the bearing housing body 62. The axis of rotation R1 of the rotor shaft therefore extends coaxial to the longitudinal axis L1 of the bearing housing body 62. The bearing housing 16 defines a surface 64 directed towards the compressor housing 14. The surface 64 lies in a plane that extends perpendicular to the longitudinal axis L1 of the bearing housing body 62.

A hub 66 defines a generally cylindrical opening 68 into the bearing housing body 62. The hub 66 is integrally connected to the bearing housing body 62 and has a ring-shaped protrusion 70 over the surface 64. The opening 68 has a circular cross-section. The longitudinal axis L1 of the bearing housing body 62 extends through the center of the opening 68 (and through the center of the hub 66).

The opening 68 has a step-wise decreasing diameter and is configured to receive multiple rotor shaft bearings. In a first portion of the opening 68 having a wider diameter, the axial bearing 60 is accommodated (see FIG. 2). In more detail, the axial bearing 60 is supported against a step that defines a transition from the wider-diameter portion of the opening 68 to a smaller-diameter portion. The smaller-diameter portion of the opening 68 accommodates a journal bearing 76 for the rotor shaft 20 (see FIG. 2). In some configurations, the journal bearing 76 comprises two separate bearing components that are spaced apart from each other along the longitudinal axis L1 of the bearing housing body 62. As is well known in the art, the bearing housing body 62 has a system of fluid channels 78 to feed a lubricating fluid such as oil to the rotor shaft bearings 60, 76 (see FIG. 2).

The cylindrical protrusion 54 of the backplate 48 partially extends into the opening 68 of the bearing housing body 62 to rest on the axial bearing 60. During assembly of the turbocharger 10, the ring-shaped protrusion 70 has a centering function when inserting the backplate protrusion 54 into the opening 68. A sealing ring 72 is arranged between an outer circumference of the cylindrical protrusion 54 and an inner wall of the opening 68. The sealing ring 72 prevents lubricating fluid from leaking out of the opening 68.

The bearing housing 16 comprises at least one arm 80 for connecting the bearing housing 16 with the compressor housing 14. In the connected state, the backplate 48 is clamped between the bearing housing 16 and the compressor housing body 46 without any separate attachment of the backplate 48 to either one of the bearing housing 16 and the compressor housing 14.

In the embodiment illustrated in the drawings, three connection arms 80 extend radially from the hub 66. It will, however, be appreciated that more or less connection arms 80 may be provided in other embodiments. For example, the two lower arms 80 in FIG. 3 may be integrated into a single connection structure having, for example, a semicircular shape. In such a configuration, only a single connection arm 80 will be provided, namely the upper arm 80 in FIG. 3.

Each connection arm 80 has a first end 82 connected to the hub 66 and a second end 84 opposite the first end 82. The second end 84 of each arm 80 comprises a connection structure 86 configured to connect the bearing housing 16 with the compressor housing 14. In the embodiment illustrated in the drawings, the connection structure 86 takes the form of a through-opening configured to receive a bolt member 88 to connect the bearing housing 16 with the compressor housing 14 (see also FIGS. 1 and 2).

Each arm 80 has a length extending from its first end 82 to its second end 84. Moreover, each arm 80 has a width extending perpendicular to its length and substantially parallel to the surface 64. It is to be noted that the different arms 80 may have different lengths and different widths, as shown in FIG. 3. In the embodiment illustrated in the drawings, the length of each arm 80 is substantially larger than the width of that arm 80 in the center between its first and the second ends 82, 84. Generally, the width of an arm 80 may be at least 1.4 times greater than the width of that arm 80 (e.g., at least 1.7 or 2.0 or 2.5 times larger).

The three arms 80 are spaced apart from each other in a circumferential direction of the longitudinal axis L1 of the bearing housing body 62. As illustrated in FIG. 3, an angular distance between each pair of adjacent arms 80 relative to the longitudinal axis L1 may approximately be the same for all arm pairs (e.g., lie between 110° and 140° in an exemplary three-arm configuration).

The second end 84 of each arm 80 comprises a connection surface 90 facing away from the bearing housing body 62 towards the compressor housing 14. The connection surfaces 90 of all arms 80 lie in a plane that perpendicularly intersects the longitudinal axis L1 of the bearing housing body 62. To reduce the contact area towards the compressor housing 14, the area of the connection surface 90 of each arm 90 is smaller than the complete surface area of that arm 80 between its first and second ends 82, 84 and directed towards the compressor housing 14. In the embodiment illustrated in FIG. 3, the connection surface area of each arm 80 is less than 50% of the respective complete arm surface area towards the compressor housing 14. Such a reduction of the contact area towards the compressor housing 14 reduces heat transfer between the bearing housing 16 and the compressor housing 14.

As shown in FIG. 3, each of the arms 80 comprises a region between its first and second ends 82, 84 that is offset, or recessed, towards the bearing housing body 62 relative to its connection surface 90. The recessed regions of the three arms 80 define the surface 64. The recessed surface 64 lies in a plane that is generally parallel to the plane spanned by the connection surfaces 90 and is offset towards the bearing housing body 62 so as to define a space 94 between the two planes (see FIG. 2). The resulting space 94 is configured to accommodate a portion of the compressor housing backplate 48 without mechanical contact between the backplate 48 and the recessed surface 64. In this way, thermal decoupling of the backplate 48 from the bearing housing body 62 is improved.

Referring now to FIG. 4, the backplate 48 has a circumference in a plane extending perpendicular to the longitudinal axis L1. The first end 82 (not shown in FIG. 4) of each arm 80 lies radially inside and the second end 84 of each arm 80 lies radially outside of that circumference. The arms 80 will thus reach over the backplate 48 without any mechanical contact therebetween. In this manner, an air gap for heat convection to ambient atmosphere is provided between a face of the backplate 48 directed towards the arms 80 and a face of each of the arms 80 directed towards the backplate 48. Moreover, open spaces are also defined between each pair of adjacent arms 80 in a circumferential direction relative to the longitudinal axis L1, as best seen in FIG. 3. These open spaces are further delimited by the face of the backplate 48 directed towards the bearing housing 16 and the bearing housing body 62. The open spaces are configured to permit heat convection to ambient atmosphere. To further enhance heat convection, the backplate 48 may be made from a material that has a high thermal conductivity, such as aluminum.

As has become apparent from the above description of exemplary embodiments, the provision of one or more arms 80 for connecting the bearing housing 16 to the compressor housing 14 results in a better thermal decoupling of the two housings 14, 16. In particular, thermal decoupling of the compressor housing backplate 48 from the bearing housing 16 can be improved. Additionally, heat convection to ambient atmosphere can be facilitated by providing an air gap between the backplate 48 and the bearing housing 16. In this way, compressor efficiency is improved as the heat flow from the bearing housing 16 to the compressor housing 14 is reduced.

The provision of connection arms 80 reduces the weight of the turbocharger 10 as a whole compared to connection solutions in which circumferentially continuous connection flanges are used. Moreover, a highly reliable bolted connection between the bearing housing 16 and the compressor housing 14 can be implemented in some variants. Such a bolted connection permits to reliably clamp the backplate 48 between the compressor housing body 46 and the bearing housing 16, without the need of a separate attachment of the backplate to any of the compressor housing body 46 and the bearing housing 16.

The invention has been described here in an illustrative manner, and it is to be understood that modifications and variations are possible in light of the above teachings. It is, therefore, to be understood that the invention may be practiced in other embodiments while still being covered by the claims that follow.

The invention claimed is:

1. A bearing housing (16) for a turbocharger (10), the bearing housing (16) comprising:
   a bearing housing body (62) configured to receive a rotor shaft (20) along a longitudinal axis (L1) of the bearing housing body (62);
   a hub (66) connected to the bearing housing body (62) and defining an opening (68) into the bearing housing body (62), the opening (68) being configured to receive a rotor shaft bearing (60, 76); and
   at least one arm (80) extending radially from the hub (66), the at least one arm (80) having a first end (82) connected to the hub (66) and a second end (84) opposite to the first end (82), wherein the second end (84) of the at least one arm (80) comprises a connection structure (86) configured to connect the bearing housing (16) with a compressor housing (14) of the turbocharger (10),
   wherein the second end (84) of the at least one arm (80) comprises a connection surface (90) facing away from the bearing housing body (62), wherein the at least one arm (80) comprises between the first end (82) and the second end (84) a recessed surface (64) facing away from the bearing housing body (62), and wherein the recessed surface (64) is offset relative to the connection surface (90) towards the bearing housing body (62).

2. The bearing housing of claim 1, wherein
   the at least one arm (80) has a length extending from its first end (82) to its second end (84), wherein the at least one arm (80) has a width extending perpendicular to its length, wherein the length of the at least one arm (80) is larger than the width of that arm (80) in a central region along its length.

3. The bearing housing of claim 1, wherein
   the bearing housing (16) comprises two or more arms (80) spaced apart in a circumferential direction of the longitudinal axis (L1).

4. The bearing housing of claim 1, wherein
   the connection structure (86) comprises at least one through-opening configured to receive a bolt member (88) to connect the bearing housing (16) with the compressor housing (14) of the turbocharger (10).

5. A housing assembly (12) comprising:
the bearing housing (16) of claim 1; and
a compressor housing (14) connected to the at least one arm (80) of the bearing housing (16), wherein the compressor housing (14) comprises:
a compressor housing body (46) configured to receive a compressor wheel (22) supported on the rotor shaft (20); and
a backplate (48) closing the compressor housing body (46) towards the bearing housing (16).

6. The housing assembly of claim 5, wherein
the at least one arm (80) is spaced apart from the backplate (46).

7. The housing assembly of claim 5, wherein
the backplate (48) has a circumference in a plane extending perpendicular to the longitudinal axis (L1), and wherein the first end (82) of the at least one arm (80) lies radially inside the circumference and the second end (84) of the at least one arm (80) lies radially outside the circumference.

8. The housing assembly of claim 5, wherein
the backplate (48) has a face directed towards the bearing housing body (62), wherein an open space is defined between two adjacent arms (80), the face of the backplate (48) and the bearing housing body (62), that is configured to enable heat convection to ambient atmosphere.

9. The housing assembly of claim 5, wherein
the backplate (48) has a face directed towards the bearing housing body (62) and the at least one arm (80) has a face directed towards the backplate (48), wherein a gap configured to enable heat convection to ambient atmosphere is provided between the face of the backplate (48) and the face of the at least one arm (80).

10. The housing assembly of claim 5, wherein
the backplate (48) comprises an annular recess (52) having a depth extending towards the compressor housing body (46) and an open side facing the bearing housing (16).

11. The housing assembly of claim 5, wherein
the backplate (48) at least partially extends into the opening (68) of the bearing housing body (62).

12. The housing assembly of claim 11, comprising:
an axial support for the backplate (48), wherein the axial support is located in the opening (68) of the bearing housing body (62).

13. The housing assembly of claim 5, comprising:
the rotor shaft bearing (60) accommodated in the opening (68) of the bearing housing body (62), wherein, in an axial force transmission path from the compressor housing body (46) to the bearing housing (16), the backplate (48) is located downstream of the compressor housing body (46) and upstream of the rotor shaft bearing (60), and the rotor shaft bearing (60) is located downstream of the backplate (48) and upstream of the bearing housing (16).

14. The housing assembly of claim 5, wherein
the bearing housing (16) comprises two or more arms (80) spaced apart in a circumferential direction of the longitudinal axis (L1), and
the backplate (48) has a face directed towards the bearing housing body (62), wherein an open space is defined between two adjacent arms (80), the face of the backplate (48) and the bearing housing body (62), that is configured to enable heat convection to ambient atmosphere.

15. A turbocharger (10) comprising the housing assembly (14, 16) of claim 5.

* * * * *